(12) United States Patent
Zhang et al.

(10) Patent No.: US 9,945,375 B2
(45) Date of Patent: Apr. 17, 2018

(54) SYSTEM AND METHOD FOR AUTOMATIC TUNING OF REFERENCE MODEL FOR FRACKING RIG PUMP

(71) Applicant: Caterpillar Inc., Peoria, IL (US)

(72) Inventors: Yanchai Zhang, Dunlap, IL (US); Zhijun Cai, Dunlap, IL (US); Venkata Dandibhotla, Peoria, IL (US); Evan Jacobson, Edwards, IL (US); Koti Padarthy, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 15/001,588

(22) Filed: Jan. 20, 2016

(65) Prior Publication Data

US 2017/0204712 A1    Jul. 20, 2017

(51) Int. Cl.
| | | |
|---|---|---|
| *E21B 43/26* | (2006.01) | |
| *F04B 53/10* | (2006.01) | |
| *G05B 17/02* | (2006.01) | |
| *G05B 19/416* | (2006.01) | |
| *G06Q 50/02* | (2012.01) | |
| *F04B 19/22* | (2006.01) | |
| *F04B 47/02* | (2006.01) | |
| *F04B 49/06* | (2006.01) | |
| *F04B 49/08* | (2006.01) | |
| *F04B 51/00* | (2006.01) | |

(52) U.S. Cl.
CPC .............. *F04B 53/10* (2013.01); *F04B 19/22* (2013.01); *F04B 47/02* (2013.01); *F04B 49/065* (2013.01); *F04B 49/08* (2013.01); *F04B 51/00* (2013.01); *G05B 17/02* (2013.01); *G05B 19/416* (2013.01); *G06Q 50/02* (2013.01); *F04B 2203/0208* (2013.01); *F04B 2205/05* (2013.01); *G05B 2219/37399* (2013.01); *G05B 2219/42162* (2013.01)

(58) Field of Classification Search
CPC .............................. E21B 43/26; E21B 41/0092
USPC .......................................................... 166/308.1
See application file for complete search history.

(56) References Cited

U.S. PATENT DOCUMENTS

| | | | |
|---|---|---|---|
| 6,814,142 B2 | 11/2004 | Faulk et al. | |
| 7,516,793 B2 * | 4/2009 | Dykstra | ................ E21B 43/267 166/177.5 |
| 7,908,230 B2 * | 3/2011 | Bailey | ..................... E21B 43/26 706/13 |

(Continued)

*Primary Examiner* — Kenneth L Thompson
(74) *Attorney, Agent, or Firm* — Baker Hostetler (57) ABSTRACT

A method for automatic tuning of a reference model for a fracking rig pump is provided. The method includes determining, at a processor connected to a fracking rig pump, a current choke area associated with the fracking rig pump based upon at least a maximum power and a maximum pressure obtained from the fracking rig pump for a pump speed of the fracking rig pump, obtaining a pump power and a pump pressure for the current choke area based upon at least a reference model for the fracking rig pump stored in a memory device coupled to the processor, determining a pressure difference between the maximum pressure obtained from the fracking rig pump and the pump pressure, determining a power difference between the maximum power obtained from the fracking rig pump and the pump power obtained from the reference model, and providing an updated choke area to the reference model.

20 Claims, 8 Drawing Sheets

(56) References Cited

U.S. PATENT DOCUMENTS

| | | |
|---|---|---|
| 8,510,015 B2 | 8/2013 | Beausoleil et al. |
| 9,104,823 B2 * | 8/2015 | Rashid .................... E21B 43/00 |
| 2009/0053072 A1 * | 2/2009 | Borgstadt ................ F04B 15/02 |
| | | 417/17 |
| 2014/0094974 A1 | 4/2014 | Rashid |
| 2016/0194942 A1 * | 7/2016 | Wiegman ................ F04B 17/03 |
| | | 166/250.15 |
| 2016/0195082 A1 * | 7/2016 | Wiegman .............. F04B 49/065 |
| | | 417/53 |
| 2017/0292513 A1 * | 10/2017 | Haddad ................... F04B 51/00 |
| 2017/0335654 A1 * | 11/2017 | Olsen ...................... E21B 34/02 |
| 2017/0335663 A1 * | 11/2017 | Dykstra .............. E21B 41/0092 |

\* cited by examiner

SYSTEM AND METHOD FOR AUTOMATIC TUNING OF REFERENCE MODEL FOR FRACKING RIG PUMP

TECHNICAL FIELD

This patent disclosure generally relates to reference models for rig pumps, and more particularly, to a system and method for automatic tuning of a reference model for a fracking rig pump.

BACKGROUND

Conventional systems and methods utilize a static pump reference model for a fracking rig pump. The reference model may be used, for example, for diagnostics of the fracking rig pump. The reference model requires a choke area (or, a restriction area) associated with the fracking rig pump to calculate a pressure signal. For example, the choke area may be present at a well-head of a fracking rig site, or along any path of the flow of fluid through the fracking rig pump. Further, multiple fracking rig pumps are generally present in the fracking rig site, all feeding to the well-head. However, the choke area changes due to different customer requirements or different stages of drilling procedure with different pump speeds on a fracking rig worksite. In practice, a change in the choke area can be realized by physical valve opening or closing. In conventional pump models that do not have valve dynamics included, there is no way to compensate for the change in the choke area in the fracking rig pump model itself. However, including valve dynamics in the reference model is often too complicated and may be unnecessary for the control purposes for which the reference model is used.

One conventional solution is to use a three-dimensional (3D) map to find an approximate value of the choke area. Given a set of maximum power, maximum pressure, and a pump speed, the choke area is approximated based on the 3D map. The 3D map is pre-calculated and is static. That is, any other set of values that is not on the nodes of the 3D map will be calculated using an interpolation method. Furthermore, the 3D map has shortcomings. For example, generating the 3D map is very time consuming, requiring manual tuning. The interpolation method is linear and not very accurate, since a relationship between the choke area and the pump parameters are not exactly known. In order to make the 3D map more accurate, a higher number of nodes in the 3D map is needed, and more nodes means more manual tuning of the map. Moreover, the 3D map is valid for one pump. If any parameter of the rig pump changes, all the tuning work of the 3D map needs to be redone. By way of example only, U.S. patent Application Publication No. 2014/0094974 discloses a conventional method in which an interpolation model for interpolating data over a domain defined by operational bounds of two control variables of a fluid production method is described.

The present disclosure addresses these problems and other problems associated with the conventional systems and methods.

SUMMARY

In one aspect of this disclosure, a method for automatic tuning of a reference model for a fracking rig pump is provided. The method includes determining, at a processor operably connected to a fracking rig pump, a current choke area associated with the fracking rig pump based upon at least a maximum power and a maximum pressure obtained from the fracking rig pump for a pump speed of the fracking rig pump. The method includes obtaining, at the processor, a pump power and a pump pressure for the current choke area from at least a reference model for the fracking rig pump stored in a memory device coupled to the processor. The method includes determining, at the processor, a pressure difference between the maximum pressure obtained from the fracking rig pump and the pump pressure obtained from the reference model. The method includes determining, at the processor, a power difference between the maximum power obtained from the fracking rig pump and the pump power obtained from the reference model. The method includes providing, at the processor, an updated choke area to the reference model based upon at least one of the power difference and the pressure difference.

In another aspect of this disclosure, a system for automatic tuning of a reference model for a fracking rig pump is provided. The system includes a fracking rig pump, a processor operably connected to the fracking rig pump, and a memory device connected to the processor and including a reference model for the fracking rig pump. The memory device includes computer executable instructions which when executed by the processor cause the processor to determine a current choke area associated with the fracking rig pump based upon a maximum power and a maximum pressure obtained from the fracking rig pump for a pump speed of the fracking rig pump, obtain a pump power and a pump pressure for the current choke area from the reference model stored in the memory device coupled to the processor, determine a pressure difference between the maximum pressure obtained from the fracking rig pump and the pump pressure obtained from the reference model, and provide an updated choke area to the reference model based upon at least one of the power difference and the pressure difference.

In yet another aspect of this disclosure, a non-transitory computer readable medium is provided. The non-transitory computer readable medium includes computer executable instructions for automatic tuning of a reference model for a fracking rig pump operably connected to a processor. The computer executable instructions when executed by the processor cause the processor to determine a current choke area associated with the fracking rig pump based upon a maximum power and a maximum pressure obtained from the fracking rig pump for a pump speed of the fracking rig pump, obtain a pump power and a pump pressure for the current choke area from the reference model stored in a memory device connected to the processor, determine a pressure difference between the maximum pressure obtained from the fracking rig pump and the pump pressure obtained from the reference model, determine a power difference between the maximum power obtained from the fracking rig pump and the pump power obtained from the reference model, and provide an updated choke area to the reference model based upon at least one of the power difference and the pressure difference.

DETAILED DESCRIPTION

Various aspects of this disclosure are related to addressing the problems in the conventional systems and methods for reference models for rig pumps. Various aspects of this disclosure provide specific details of a system and a method for automatic tuning of a reference model for a fracking rig pump.

Figure 1:
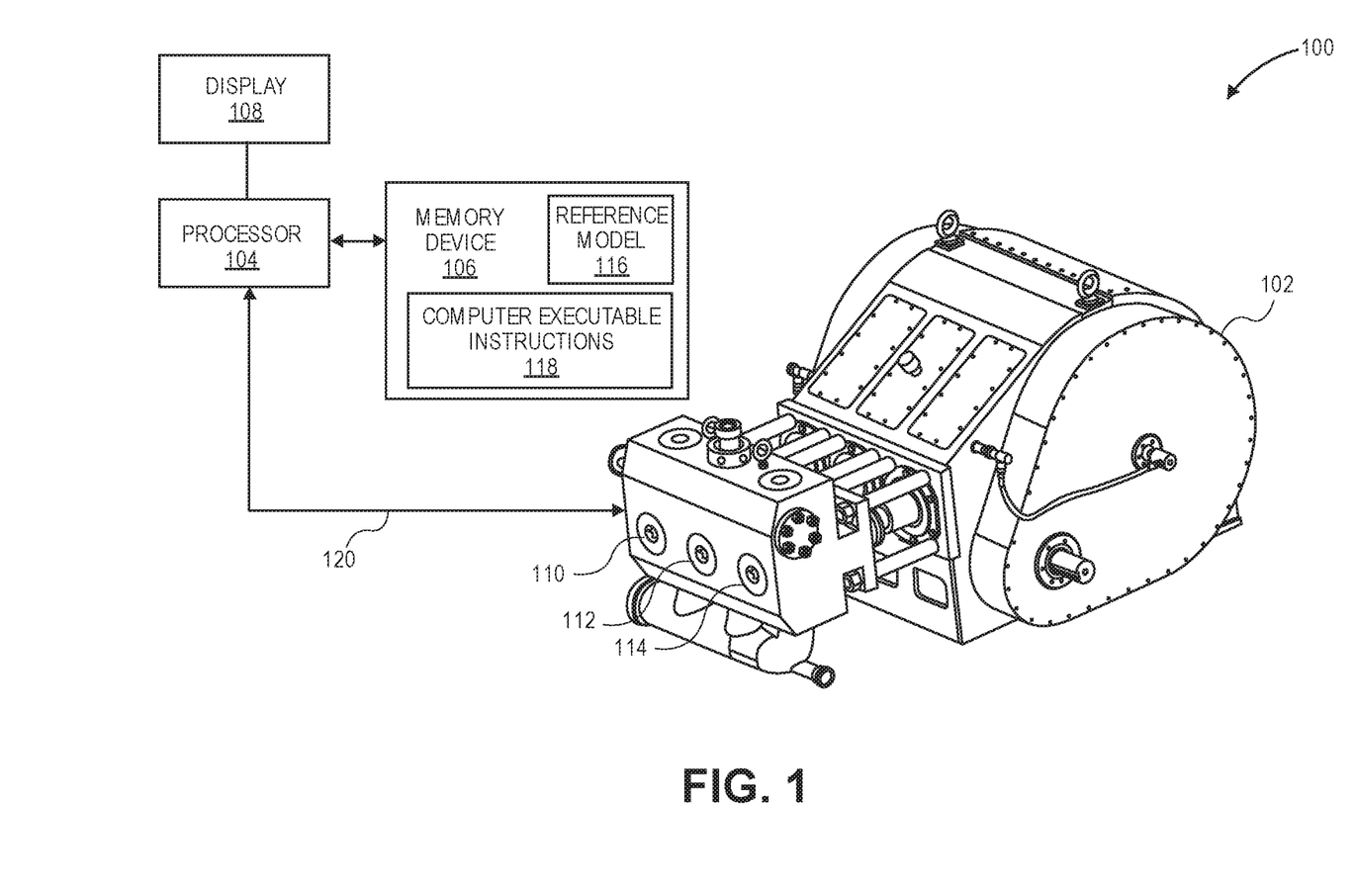
FIG. 1 illustrates a system for automatic tuning of a reference model for a fracking rig pump, in accordance with an aspect of this disclosure.

Now referring to the drawings, where like reference numerals refer to like elements, FIG. 1 illustrates a system 100 for automatic tuning of a reference model 116 for a fracking rig pump 102, in accordance with an aspect of this disclosure. The system 100 includes a processor 104 operably connected to the fracking rig pump 102, a memory device 106 connected to the processor 104, and a display 108 connected to the processor 104. The processor 104 may be operably connected to the fracking rig pump 102 via a communication link 120. The communication link 120 may be wired, wireless, optical, and/or combinations thereof. The term "operably connected" or "operably coupled" may relate to a direct connection between the processor 104 and the fracking rig pump 102, or may relate to an indirect connection between the processor 104 and the fracking rig pump 102 with intermediate components and equipment in between. For example, such an operably connected arrangement between the processor 104 and the fracking rig pump 102 may be associated with the processor 104 communicating with one or more sensors of the fracking rig pump 102.

The fracking rig pump 102 may be located geographically in a worksite where energy exploration is carried out, e.g., by using a fracking process, although the fracking rig pump 102 may be used for other types of worksites also, e.g., an active oil production site. By way of example only and not by way of limitation, the fracking rig pump 102 may include a first cylinder 110, a second cylinder 112, and a third cylinder 114 through which a fluid (e.g., water) passes under pressure. The fracking rig pump 102 may include additional components such as pistons, plungers, suction or inlet valves, discharge valves, etc., as known to one of ordinary skill in the art, which additional components will not be described in detail herein. Further, the system 100 may include a plurality of fracking rig pumps similar to the fracking rig pump 102, arranged in parallel, in serial, or a combination of both to each other, feeding into a single well-head at the fracking rig site, as will be appreciated by one of ordinary skill in the art.

Figure 2:
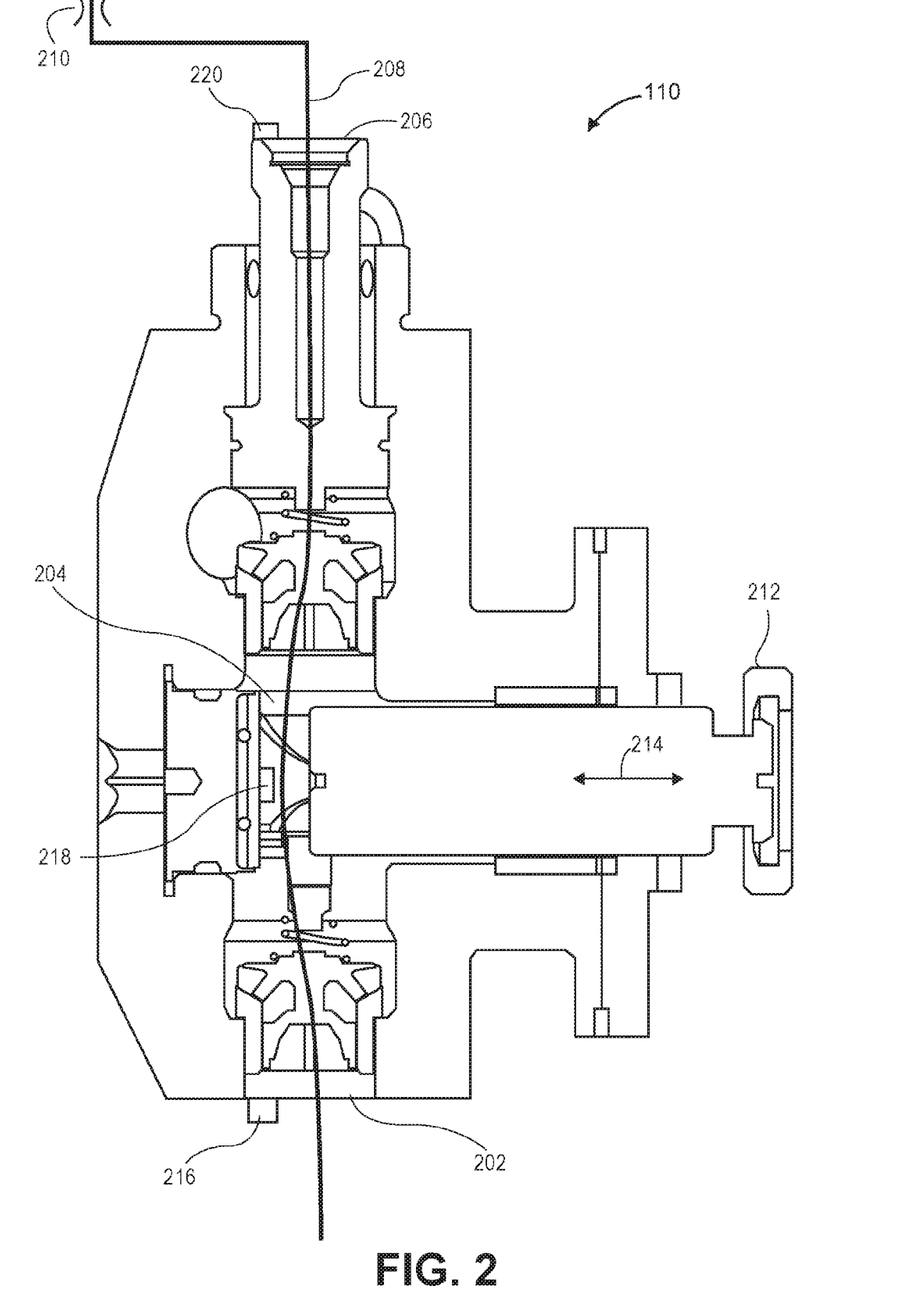
FIG. 2 illustrates a cutout diagram showing a cylinder of the fracking rig pump of FIG. 1, in accordance with an aspect of this disclosure.

Referring to FIG. 2, a cutout diagram showing the first cylinder 110 of the fracking rig pump 102 of FIG. 1 is illustrated, in accordance with an aspect of this disclosure. It will be appreciated by one of ordinary skill in the art that the description herein with respect to the first cylinder 110 is equally applicable to the second cylinder 112 and the third cylinder 114. The first cylinder 110 may include an inlet 202 to a fluid pathway 204 at one end, and a corresponding outlet 206 to the fluid pathway 204 at a second end. Fluid(s) may flow from the inlet 202 to the outlet 206 in a direction indicated by an arrow 208. The flow of the fluid(s) may occur through a volume inside the fracking rig pump 102 to a choke area 210 at the well-head of the fracking rig site. The choke area 210 may be variable depending upon a stage of an overall fracking process at the fracking rig site where the system 100 is deployed. The flow of fluid through the fracking rig pump 102 may be controllable by a plunger 212 movable bi-directionally generally along a direction indicated by a bi-directional arrow 214. A movement of the plunger 212 may be made manually, via actuators (not shown) controlled, for example, by the processor 104, or combinations thereof. As the choke area 210 varies, the reference model 116 may be automatically tuned to reflect various parameters associated with an updated value of the choke area 210 at the well-head. As an example, the actual value of the choke area 210 at the well-head and a value of the choke area 210 in the reference model 116 should match or be equal for the reference model 116 to be an accurate simulation of the fracking rig pump 102. Such matching may be in real-time, as and when the choke area 210 changes at the fracking rig site. In certain aspects, an acceptable value of the choke area 210 provided by the reference model 116 to an operator of the fracking rig pump 102 (e.g., viewing the display 108) may be within a tolerance range of values of the actual value of the choke area 210 at a given time instant.

In one aspect, a suction pressure sensor 216 may be placed at an entry point of a fluid to the inlet 202, an in-cylinder pressure sensor 218 may be placed in the volume inside the fracking rig pump 102 through which the fluid flows, and a discharge pressure sensor 220 may be placed at the outlet 206 of a manifold of the fracking rig pump 102 where the fluid exits toward the well-head with the choke area 210. The suction pressure sensor 216, the in-cylinder pressure sensor 218, and the discharge pressure sensor 220 may be operably connected to or communicably coupled to the processor 104 to provide respective electrical/electromagnetic signals corresponding to instantaneous pressure at the inlet 202, the volume inside the fracking rig pump 102, and the outlet 206, respectively. By way of example only and not by way of limitation, the suction pressure sensor 216, the in-cylinder pressure sensor 218, and the discharge pressure sensor 220 may be electrical sensors, mechanical sensors, electro-mechanical sensors, piezo-electric sensors, magnetic sensors, electromagnetic sensors, vacuum sensors, flow-meters, combinations thereof, and the like. It will be appreciated by one of ordinary skill in the art in view of this disclosure that a variation in the choke area 210 at the well-head of the fracking rig site will alter a discharge pressure at the outlet 206, and accordingly a pump power and a pump pressure for the fracking rig pump 102. The variation in the choke area 210 may be accompanied by a change in the flow of fluid through and exiting the fracking rig pump 102. Such a change in the flow is associated with adjustment in a pump speed provided by the reference model 116. That is, the pump speed in the reference model 116 should correspond to an actual value of a pump speed of the fracking rig pump 102 for the current value of the choke area 210. The variation in the choke area 210 may be due to various reasons, including but not limited to changes in drilling requirements, a leak in the fracking rig pump 102, a leak in a path of the fluid flow outside and/or inside the fracking rig pump 102, and the like, or combinations thereof.

Figure 3:
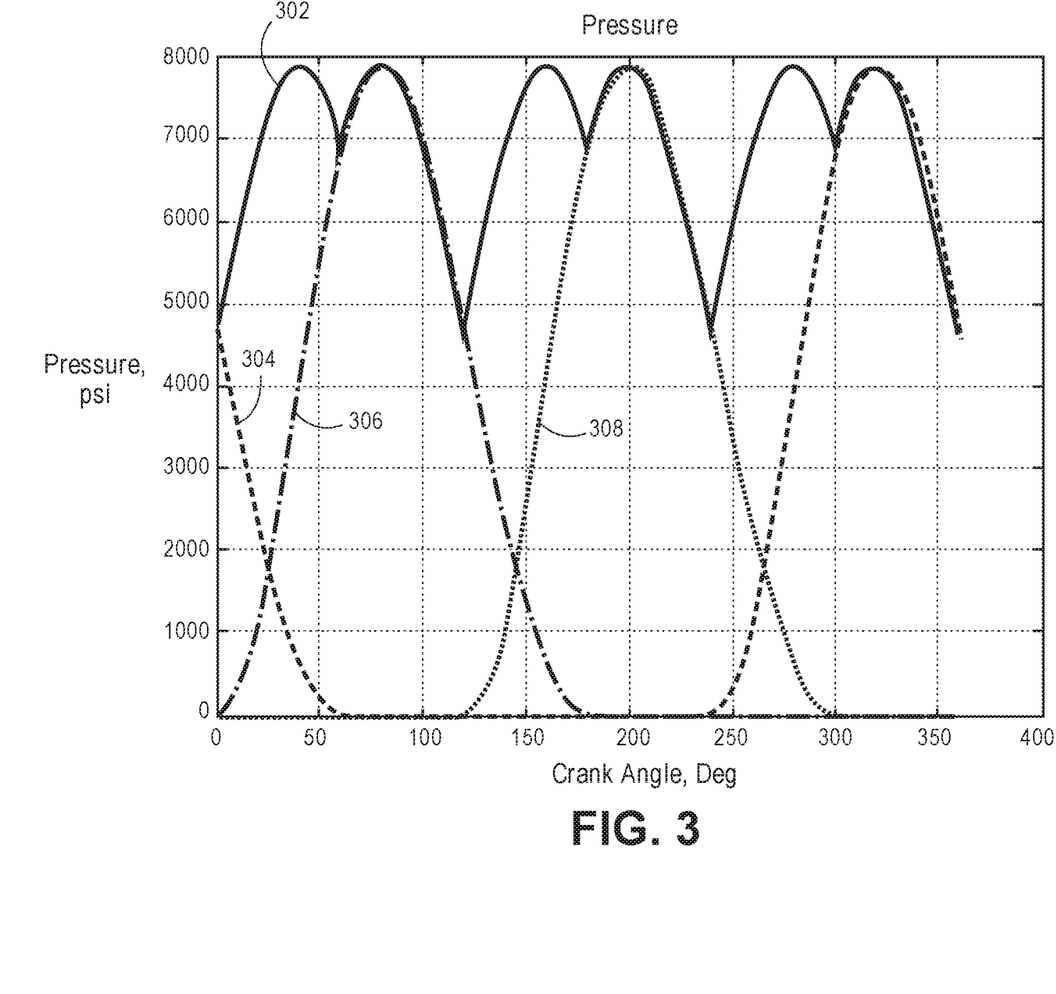
FIG. 3 illustrates an aggregate discharge pressure from the fracking rig pump along with individual in-cylinder pressures from individual cylinders of the fracking rig pump, in accordance with an aspect of this disclosure.

In one aspect, the processor 104 may aggregate signals from individual ones of the discharge pressure sensors similar to the discharge pressure sensor 220 inside the first cylinder 110, the second cylinder 112, and the third cylinder 114 (and/or other fracking rig pumps at the fracking rig site where the fracking rig pump 102 is deployed) to obtain an overall discharge pressure at an output of the fracking rig pump 202. Such an aggregate discharge pressure 302 is illustrated in FIG. 3 as a function of a crank angle (measured in degrees)(° , for example) of the fracking rig pump 102. The aggregate discharge pressure 302 is a sum of a first in-cylinder pressure 304, a second in-cylinder pressure 306, and a third in-cylinder pressure 308 from the first cylinder 110, the second cylinder 112, and the third cylinder 114, respectively. As illustrated in FIG. 3, the aggregate discharge pressure 302, as well as the first in-cylinder pressure 304, the second in-cylinder pressure 306, and the third in-cylinder pressure 308 have a periodic shape, although non-periodic shapes may occur under different fluid pressure scenarios. Further, as a number of cylinders in the fracking rig pump 102 increases, the aggregate discharge pressure 302 may tend to have a shape resembling a straight line relative to a time ordinate and/or a crank angle ordinate, indicating a constant output discharge pressure from the fracking rig pump 102 under a normal course of operation. Furthermore, it will be appreciated by one of ordinary skill in the art that the aggregate discharge pressure 302 may correspond to an instantaneous pressure of the fracking rig pump 102. Likewise, instead of the aggregate discharge pressure 302, an aggregate discharge power of the fracking rig pump 102 may be used. Such an aggregate discharge power may have a similar variation as the aggregate discharge pressure 302, and may correspond to an instantaneous pump power for the fracking rig pump 102. In one aspect, the aggregate discharge pressure 302 and/or the aggregate discharge power may be displayed on the display 108.

Figure 4:
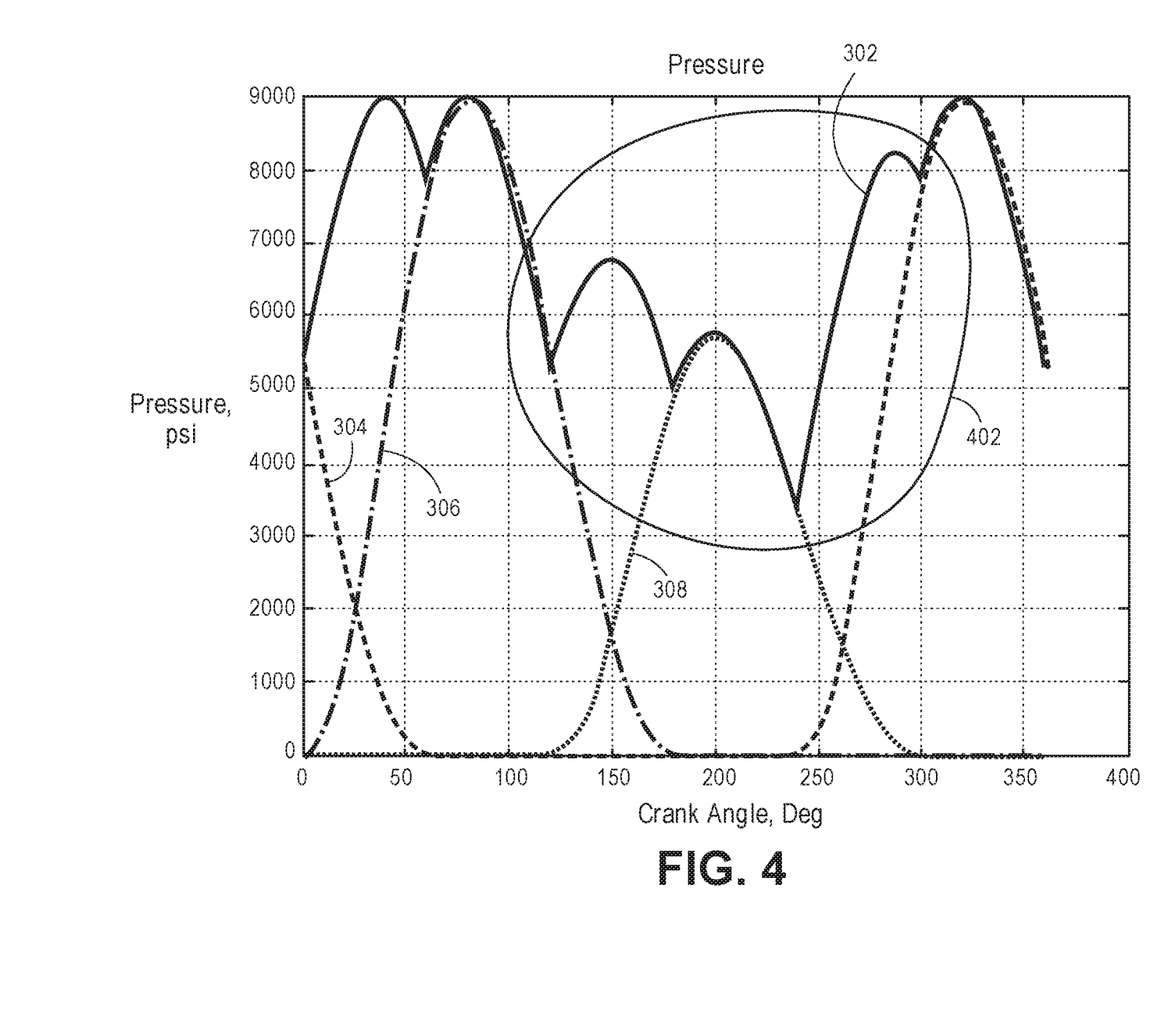
FIG. 4 illustrates a change in the aggregate discharge pressure from the fracking rig pump along with a change in at least one of the individual in-cylinder pressures from the cylinders of the fracking rig pump, in accordance with an aspect of this disclosure.

As illustrated in the example of FIG. 4, the aggregate discharge pressure 302 has a pressure variation 402 at a time instance for a particular crank angle for a change in the second in-cylinder pressure 306. The pressure variation 402 may be periodic or aperiodic in nature, and may be a dip or a rise in the aggregate discharge pressure 302. Such a change in the second in-cylinder pressure 306 may be due to various reasons, including but not limited to an accidental leak in the fluid pathway 204 or elsewhere in the system 100, a change in the input pressure provided at the inlet 202 due to a change in the fracking operation in which the fracking rig pump 102 is utilized, a change in the choke area 210 of the well-head of the fracking rig site, and the like, or combinations thereof.

As a result, to accommodate such variations in the operating conditions of the fracking rig pump 102 at the fracking rig site, the reference model 116 needs to provide a correct value of the aggregate discharge pressure 302 that matches an actual value of a pressure output from the fracking rig pump 102. Accordingly, to account for the pressure variation 402, an updated choke area is provided by the reference model 116 for use by the operator of the fracking rig pump 102.

Referring back to FIG. 1, the processor 104 is a hardware device such as an integrated circuit (IC) chip fabricated to implement various features and functionalities of the aspects discussed herein. By way of example only and not by way of limitation, the processor 104 may be fabricated using a Complementary Metal Oxide Semiconductor (CMOS) fabrication technology. The processor 104 is not a generic processor and is instead customized to handle various signals and parameters associated with and specific to the fracking rig pump 102 and the system 100. For example, the processor 104 may be implemented as an Application Specific Integrated Circuit (ASIC), a Field Programmable Gate Array (FPGA), a System-on-a-Chip (SOC), or the like, customized to accept, process, and output signals having specific waveform, amplitude and phase for operation of the fracking rig pump 102 and simulation thereof using the reference model 116. The processor 104 may include components such as packaging, input and output pins, heat sinks, signal conditioning circuitry, input devices, output devices, processor memory components, cooling systems, power systems and the like, which are not shown in FIG. 1. The processor 104 may be configured to execute software and computer executable instructions 118 associated with the operation of various parts of the system 100 in general, and the fracking rig pump 102 in particular. In one aspect, the processor 104 may be part of a computing system of a base station (not shown), physically located remote from the fracking rig pump 102. Alternatively, the processor 104 may be part of an electronic controller unit (ECU) of a machine coupled to the fracking rig pump 102 to operate the fracking rig pump 102.

The memory device 106 may be implemented as a non-transitory computer readable medium. Such non-transitory computer readable storage medium may include semiconductor memory, optical memory, magnetic memory, mono- or bi-stable circuitry (flip-flops, etc.) and the like, or combinations thereof. Such non-transitory computer readable storage medium excludes signals that are transitory. In one aspect, the non-transitory computer readable medium may store the computer executable instructions 118, which when executed by the processor 104 may cause the processor 104 to implement the various features and functionalities of this disclosure. By way of example only, the memory device 106 may be a semiconductor based memory device including but not limited to random access memory (RAM), read only memory (ROM), Dynamic RAM, Programmable ROM, Electrically Erasable programmable ROM (EEPROM), Static RAM, Flash memory, combinations thereof, or other types of memory devices known to one of ordinary skill in the art. The memory device 106 may be coupled to the processor 104 directly via an electrical bus, for example, inside an ECU of a machine.

Figure 5:
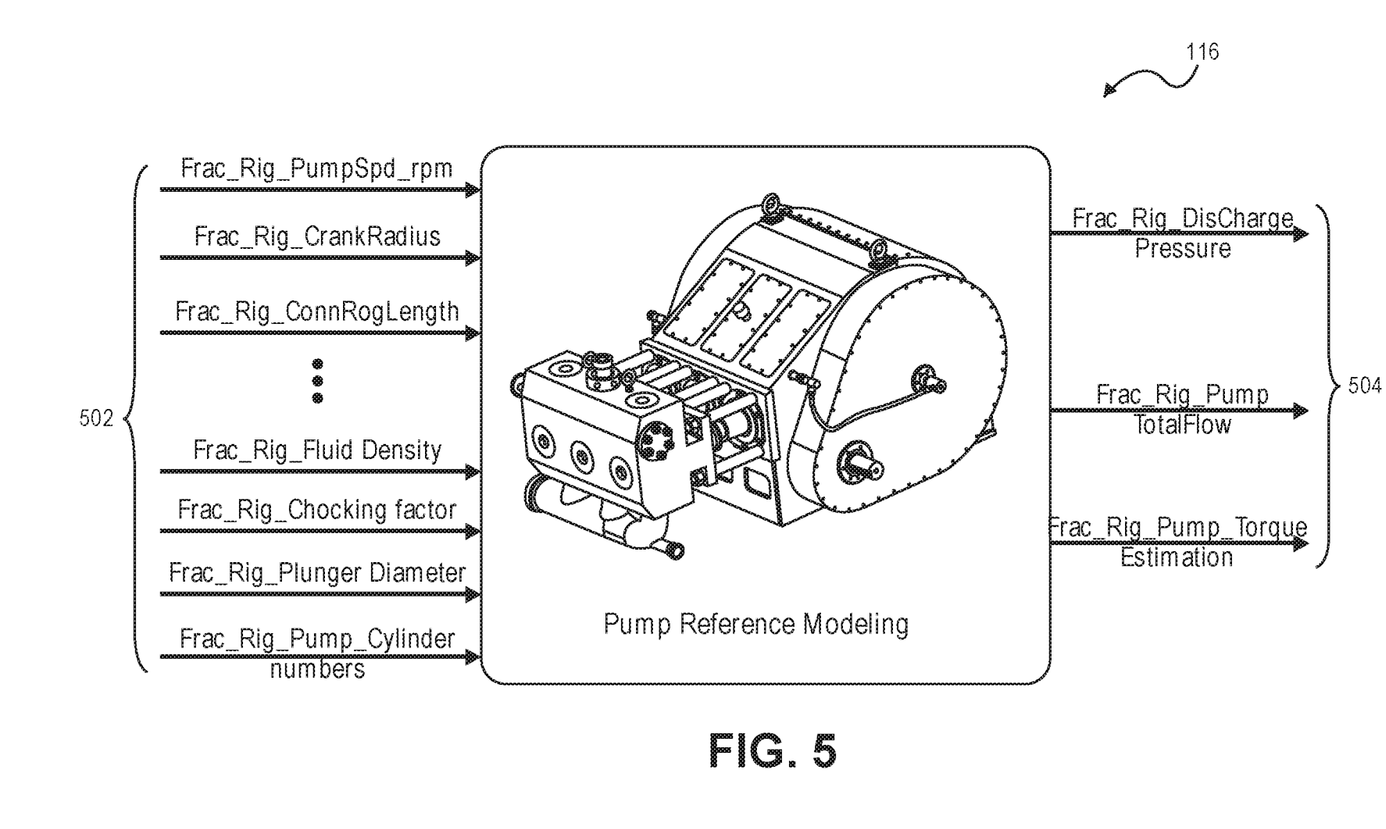
FIG. 5 illustrates an example of a reference model for the fracking rig pump stored in a memory device of the system of FIG. 1, in accordance with an aspect of this disclosure

The memory device 106 may store the reference model 116. Referring to FIG. 5, the reference model 116 may provide an on-line real-time simulation of the fracking rig pump 102 to an operator, for example, as a graphical user interface (GUI) or as a visual icon displayed on the display 108. The term "real-time" may relate to instantaneous reflection of operation of the fracking rig pump 102 as and when parameters change when the fracking rig pump 102 is operating. The term "on-line" may refer to the reference model 116 being available to the operator at the fracking rig site where the fracking rig pump 102 is deployed during operation of the fracking rig pump 102 via the display 108 and/or other computing equipment. In one aspect, the reference model 116 of the fracking rig pump 102 may include a plurality of input parameters 502 and output parameters 504 associated with the fracking rig pump 102. The input parameters 502 may include, but are not limited to, a pump speed (e.g., in rotations per minute or rpm), a pump power, a fracking rig crank radius, a fracking rig connection rod length, a fracking rig fluid density, a fracking rig choking factor, a fracking rig plunger diameter, fracking rig pump cylinders number (e.g., three for FIG. 1), a previously calculated value for the choke area 210, a maximum pump power, a maximum pump pressure, and the like, associated with the fracking rig pump 102 and/or other fracking rig pumps that may be present in the system 100. Likewise, the reference model 116 may include the output parameters 504 provided to the processor 104, including but not limited to, a fracking rig pump discharge pressure (corresponding to the aggregate discharge pressure 302), a fracking rig pump total flow, a fracking rig pump torque estimation, and the like. It will be appreciated by one of ordinary skill in the art in view of this disclosure, that the reference model 116 may include additional input and output parameters particular to a specific type of the fracking rig pump 102, and that the input parameters 502 and the output parameters 504 illustrated in FIG. 5 are by way of example only and not by way of limitation. The reference model 116 may be displayed on the display 108 as a simulation of the fracking rig pump 102 deployed in an actual fracking rig site.

Referring back to FIG. 1, the display 108 may be a standard display known to one of ordinary skill in the art, including but not limited to, a liquid crystal display (LCD), an organic light emitting diode (OLED) type display, a cathode ray tube (CRT) display, and the like. The display 108 may be part of a computing device, a mobile device (e.g., a mobile telephone), a projector screen in a base station remote from the fracking rig pump 102, and the like.

INDUSTRIAL APPLICABILITY

The present disclosure is applicable generally to reference models for rig pumps, and more particularly, to the system 100 and a method 600 for automatic tuning of the reference model 116 for the fracking rig pump 102.

Conventional systems and methods utilize a static pump reference model for a fracking rig pump. The reference model may be used, for example, for diagnostics of the fracking rig pump. The reference model requires a choke area (or, a restriction area) associated with the fracking rig pump to calculate a pressure signal. For example, the choke area may be present at a well-head of a fracking rig site, or along any path of the flow of fluid through the fracking rig pump. Further, multiple fracking rig pumps are generally present in the fracking rig site, all feeding to the well-head. However, the choke area changes due to different customer requirements or different stages of drilling procedure with different pump speeds on a fracking rig worksite. In practice, a change in the choke area can be realized by physical valve opening or closing. In conventional pump models that do not have valve dynamics included, there is no way to compensate for the change in the choke area in the fracking rig pump model itself. However, including valve dynamics in the reference model is often too complicated and may be unnecessary for the control purposes for which the reference model is used.

One conventional solution is to use a three-dimensional (3D) map to find an approximately accurate value of the choke area. Given a set of maximum power, maximum pressure and a pump speed, the choke area is determined approximately based on the 3D map. The 3D map is pre-calculated and is static. That is, any other set of values that is not on the nodes of the 3D map will be calculated using an interpolation method. Furthermore, the 3D map has shortcomings. For example, generating the 3D map is very time consuming, requiring manual tuning. The interpolation method is linear and not very accurate, since a relationship between the choke area and the pump parameters are not exactly known. In order to make the 3D map more accurate, a higher number of nodes in the 3D map is needed, and more nodes means more manual tuning of the map. Moreover, the 3D map is valid for one pump. If any parameter of the rig pump changes, all the tuning work of the 3D map needs to be redone. By way of example only, U.S. patent Application Publication No. 2014/0094974 discloses a conventional method in which an interpolation model for interpolating data over a domain defined by operational bounds of two control variables of a fluid production method is described.

The present disclosure addresses these problems and other problems associated with the conventional systems and methods.

Figure 6:
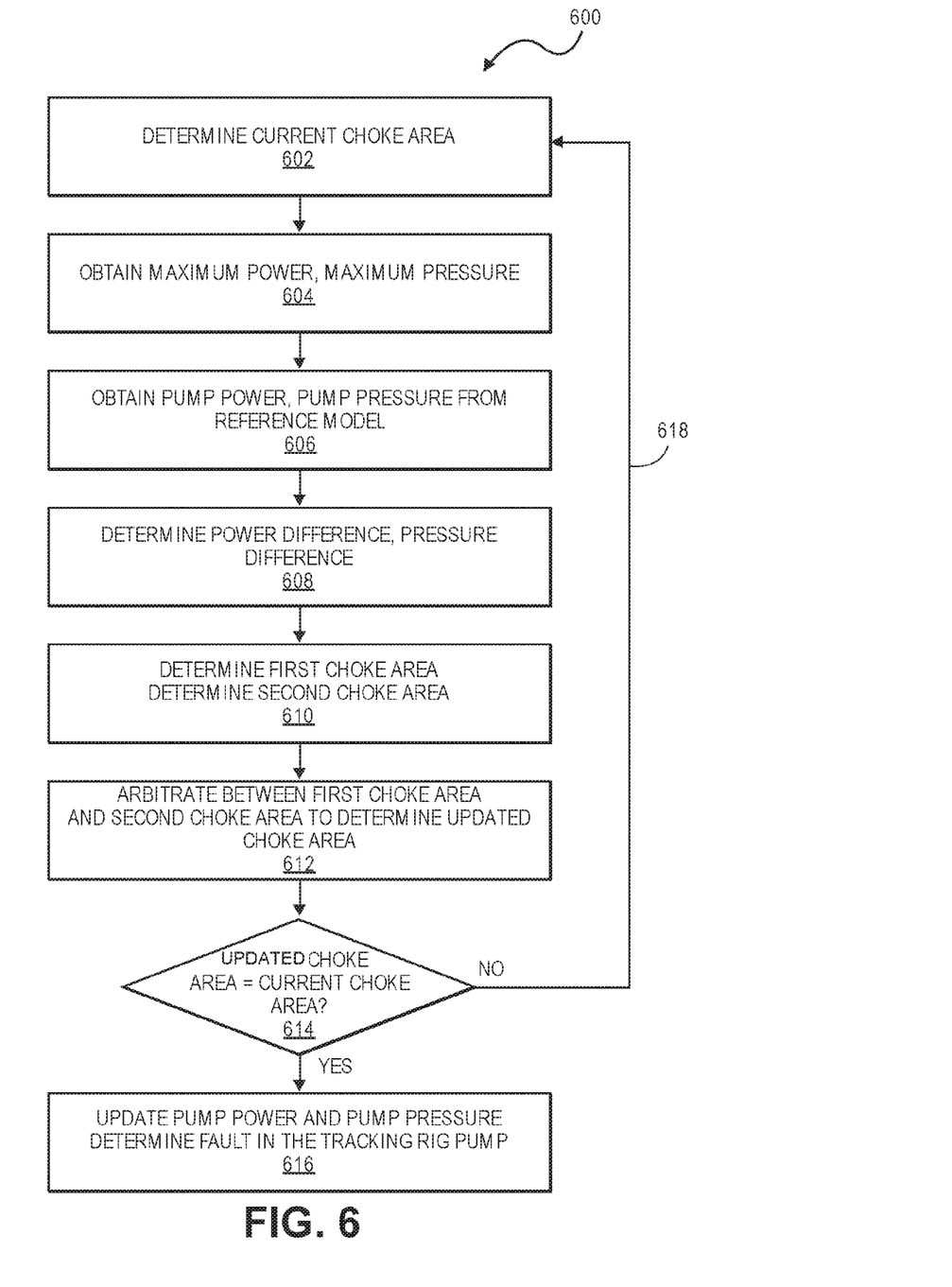
FIG. 6 illustrates a method for automatic tuning of the reference model for the fracking rig pump, in accordance with an aspect of this disclosure.

Referring to FIG. 6, the method 600 for automatic tuning of the reference model 116 for the fracking rig pump 102 is illustrated, in accordance with an aspect of this disclosure. FIG. 6 presents the method 600 as a flow diagram, although the method 600 may be understood using other types of presentations such as process diagrams, graphs, charts, equations, timing diagrams, etc. In one aspect, one or more processes or operations in the method 600 may be carried out by the processor 104 based upon a communication over the communication link 120 between the processor 104 and the fracking rig pump 102. The method 600 may at least partially be implemented by executing the computer executable instructions 118 stored in the memory device 106.

In another aspect, in the method 600, one or more processes or operations, or sub-processes thereof, may be skipped or combined as a single process or operation, and a flow of processes or operations in the method 600 may be in any order not limited by the specific order illustrated in FIG. 6. For example, one or more processes or operations may be moved around in terms of their respective orders, or may be carried out in parallel. The term "flow," as used with respect to FIG. 6, generally refers to a logical progression of operations in an exemplary manner carried out, for example, by the processor 104. However, such a flow is by way of example only and not by way of limitation, as at a time, the flow may proceed along multiple operations or processes of the method 300. Further, the method 600 may be carried out by the processor 104 for various types of fracking rig pumps and is not limited to the fracking rig pump 102. The method 600 may be implemented by the processor 104 in a high level or a low level programming language (e.g., C++, assembly language, etc.) using logic circuitry within the processor 104 and by executing the computer executable instructions 118 in the memory device 106.

The method 600 may begin in an operation 602 where the processor 104 determines a current choke area value for the choke area 210. The current choke area may be an initial value of the choke area 210 when the fracking rig pump 102 is started. Alternatively, the processor 104 may utilize a value of the current choke area from the reference model 116 as an initial value. In one aspect, the current choke area may be a last calculated value of the choke area 210 available to the processor 104 from the reference model 116. In this respect, the processor 104 may iteratively determine the current choke area by performing the method 600 until the current choke area converges to a single value indicative of the current value for the choke area 210, as discussed with respect to the operations 604-616.

In an operation 604, the processor 104 obtains a maximum power of the fracking rig pump 102 during operation of the fracking rig pump 102. The maximum power may be obtained by the processor 104 over the communication link 120. The maximum power of the fracking rig pump 102 is determined for a pump speed. For example, when the fracking rig pump 102 is a triplex pump, the maximum power for a constant pump speed of 150 rpm is 2700 hp, as illustrated by a pump power plot 704 in FIG. 7. The pump speed may be conveyed by a speed sensor (not shown) coupled to the fracking rig pump 102 and communicating with the processor 104, for example. In one aspect, the maximum pump power may be a starting value or a starting point for the reference model 116 to calculate a current or an instantaneous pump. power in an iterative loop, e.g., implemented by a feedback loop 618.

Likewise, still in the operation 604, the processor 104 obtains a maximum pressure of the fracking rig pump 102 during operation of the fracking rig pump 102. The maximum pressure may be obtained by the processor 104 over the communication link 120. The maximum pressure of the fracking rig pump 102 is determined for the pump speed measured, for example, by the speed sensor in the fracking rig pump 102 and provided to the processor 104. For example, when the fracking rig pump 102 is a triplex pump, the maximum pressure for a constant pump speed of 150 rpm is 14750 psi, as illustrated in a pump pressure plot 706 in FIG. 7. Similar to the maximum pump power, the maximum pump pressure may serve as a starting point for determining a current pump pressure of the fracking rig pump 102 during operation at the fracking rig site. Both the current pump pressure and the current pump power determined in the operation 604 are used by the processor 104 to obtain independent current values of the choke area 210, as discussed with respect to operations 606-616 herein. In this sense, the maximum pressure value (known and fixed for a particular type of the fracking rig pump 102) and the maximum power value (also known and fixed for a particular type of the fracking rig pump 102) form seed values or starting values for the method 600 for tuning the reference model 116 to be an accurate representation of the fracking rig pump 102. Accordingly, alternative values of power and pressure may be used as seed values or starting values for the method 600 to iterate.

In an operation 606, the processor 104 obtains a pump power and a pump pressure for the fracking rig pump 202 for the current pump speed from the reference model 116. Generally, the reference model 116 of the fracking rig pump 102 will have values of the pump power and the pump pressure corresponding to various pump speeds. Such values may be stored in a database (not shown) in the memory device 106 and used in the reference model 116 to build a simulation of the fracking rig pump 102. As an example, the pump power and the pump pressure obtained by the processor 104 may match the actual pump power and actual pump pressure obtained from the fracking rig pump 102 for a given pump speed.

Accordingly, in an operation 608, the processor 104 compares the pump power with the maximum pump power (used as a starting point for comparison), and the pump pressure with the maximum pump pressure (used as another starting point for comparison), respectively. Based upon the comparison, the processor 104 calculates a power difference between the pump power from the reference model 116 and the maximum power obtained from the fracking rig pump 102. Likewise, based upon the comparison, the processor 104 calculates a pressure difference between the pump pressure from the reference model 116 and the maximum pressure obtained from the fracking rig pump 102. For each iteration of the method 600, the pressure difference and the power difference should diminish, and eventually converge to zero. This happens because after the initial input of the maximum pressure and the maximum power the processor 104 will, for subsequent iterations, utilize a lower pressure value instead of the maximum pressure and a lower power value instead of the maximum power to obtain subsequent pressure difference and power difference values.

Further, the processor 104 may obtain the power difference and/or the pressure difference using a 3D map, in addition to the reference model 116. Such a 3D map may be stored in the memory device 106. In this sense, the processor 104 utilizes at least the reference model 116 to determine the pressure difference and the power difference. However, use of the 3D map may be optional.

In an operation 610, the processor 104 determines a first choke area based on the pressure difference calculated in the operation 608. Likewise, in the operation 610 the processor 104 determines a second choke area based on the power difference. The first choke area and the second choke area are each determined by the processor 104 corresponding to what an actual value of the choke area 210 should be for the comparisons of the pump power and the pump pressure obtained from the reference model 116 with the maximum power and the maximum pressure, respectively, in the operations 604-608. Each of the pump pressure and the pump power yielding the pressure difference and the power difference correspond to the first choke area and the second choke area, respectively. For example, the reference model 116 may store a look-up table of values for the choke area 210 for each value of the pump power and the pump pressure, or for each value of the pump power and the pump pressure. Each time the operation 610 is carried out, the first choke area and the second choke area converge closer and closer to the actual value of the choke area 210. The first choke area and the second choke area may be same or may be different as the method 600 is carried out iteratively by the processor 104.

In one aspect of this disclosure, the power difference may be used by the processor 104 to calculate a first choke area adjustment corresponding to the first choke area. The first choke area adjustment indicates a first error between the maximum power and the pump power from the reference model 116. The first error obtained from the first choke area adjustment indicates how far the first choke area is from an actual value of the choke area 210 at the well-head of the fracking rig site. The first error is then applied to adjust a step size used to go from the maximum power value used in the operation 604 to the next lower power value for comparison with the pump power in the reference model 116 (in the operation 608). As the method 600 is performed iteratively, the first choke area adjustment is used to accordingly adjust the starting value for the pump power for each iteration (starting from the maximum power to the lower power values). As discussed, each iteration will yield a value for the first choke area corresponding to the comparison of the lower power(s) or the maximum pump power (as the case might be) to the pump power stored in the reference model 116.

Likewise, the pressure difference may be used by the processor 104 to a second choke area adjustment corresponding to the second choke area. The second choke area adjustment indicates a second error between the maximum pressure and the pump pressure from the reference model 116. The second error obtained from the second choke area adjustment indicates how far the second choke area is from an actual value of the choke area 210 at the well-head of the fracking rig site. The second error is then applied to adjust a step size used to go from the maximum pressure value used in the operation 604 to the next lower pump pressure value for comparison with the pump pressure in the reference model 116 (in the operation 608). As the method 600 is performed iteratively, the second choke area adjustment is used to accordingly adjust the starting value for the pump pressure for each iteration (starting from the maximum pump pressure to the lower pump pressure values). As discussed, each iteration will yield a value for the second choke area corresponding to the comparison of the pump pressure or the maximum pump pressure (as the case might be) to the pump pressure stored in the reference model 116.

In an operation 612, the processor 104 arbitrates between the first choke area and the second choke area. The arbitrated one of the first choke area and the second choke becomes an updated choke area for the choke area 210. The arbitrating is carried out at each iteration of the method 600 and the processor 104 determines which one of the first choke area and the second choke area is convergent to, or closer to, the actual value of the choke area 210. The earliest convergent value between the first choke area and the second choke area is selected as the updated choke area for the reference model and may be stored in the memory device 106. Although the processor 104 may have access to the real-time current or actual value of the choke area 210, the calculation of the first choke area and the second choke area is done to fine tune the reference model 116 to reflect the real-life scenario of operation of the fracking rig pump 102.

In an operation 614, if the updated choke area is equal to the current choke area determined in the operation 602, then the method 600 proceeds to an operation 616. However, if the updated choke area is not equal to the current choke area determined in the operation 602, the method 600 goes back to the operation 602 indicated by the feedback loop 618, and the operations 602-612 are carried out again until the updated choke area and the current choke area converge to a single value.

In an operation 616, once a converged value of the updated choke area has been determined by the processor 104 to match the current value of the choke area 210, the reference model 116 is then deemed validated as accurate for further analysis of the fracking rig pump 102. The processor 104 may then update the pump power and the pump pressure in the reference model 116 to correspond to the updated choke area and may use the updated choke area value to determine a potential fault or an actual fault in the fracking rig pump 102 and/or the system 100 in general. For example, the value of the choke area 210 in the reference model 116 may be updated in response to the pressure variation 402 observed due to a change in the second in-cylinder pressure 306 at a crank angle of the fracking rig pump 102. In another example, the pressure variation 402 may arise from a change in a pressure at the well-head of the fracking rig site due to a layer of the earth under the well-head yielding to a fluid pumped under pressure by the fracking rig pump 102. In yet another example, the pressure variation 402 may be due to a leak in the first cylinder 110, the second cylinder 112, and the third cylinder 114.

Accordingly, the operator can then have access to an accurate simulation of the fracking rig pump 102 based upon the reference model 116, which now has the updated choke area, and therefore reflects a current real-time scenario. Then, the operator can tweak other variables to simulate how the fracking rig pump 102 will operate under different conditions, as part of a multi-variable analysis of the fracking rig pump 102 using the reference model 116, which has been validated and tuned by the processor 104 implementing the method 600. For example, once the reference model 116 has been automatically tuned, the operator can change other variables to diagnose any potential issues that may arise during a stress testing of the fracking rig pump 102, or may be able to identify parts of the fracking rig pump 102 that may malfunction for certain values of those variable, and the like. In another example, the operator may use the reference model 116 to compare how the simulation of the fracking rig pump 102 compares with an actual performance of the fracking rig pump 102, and accordingly gain insights for various conditions of operation of the fracking rig pump 102.

Figure 7:
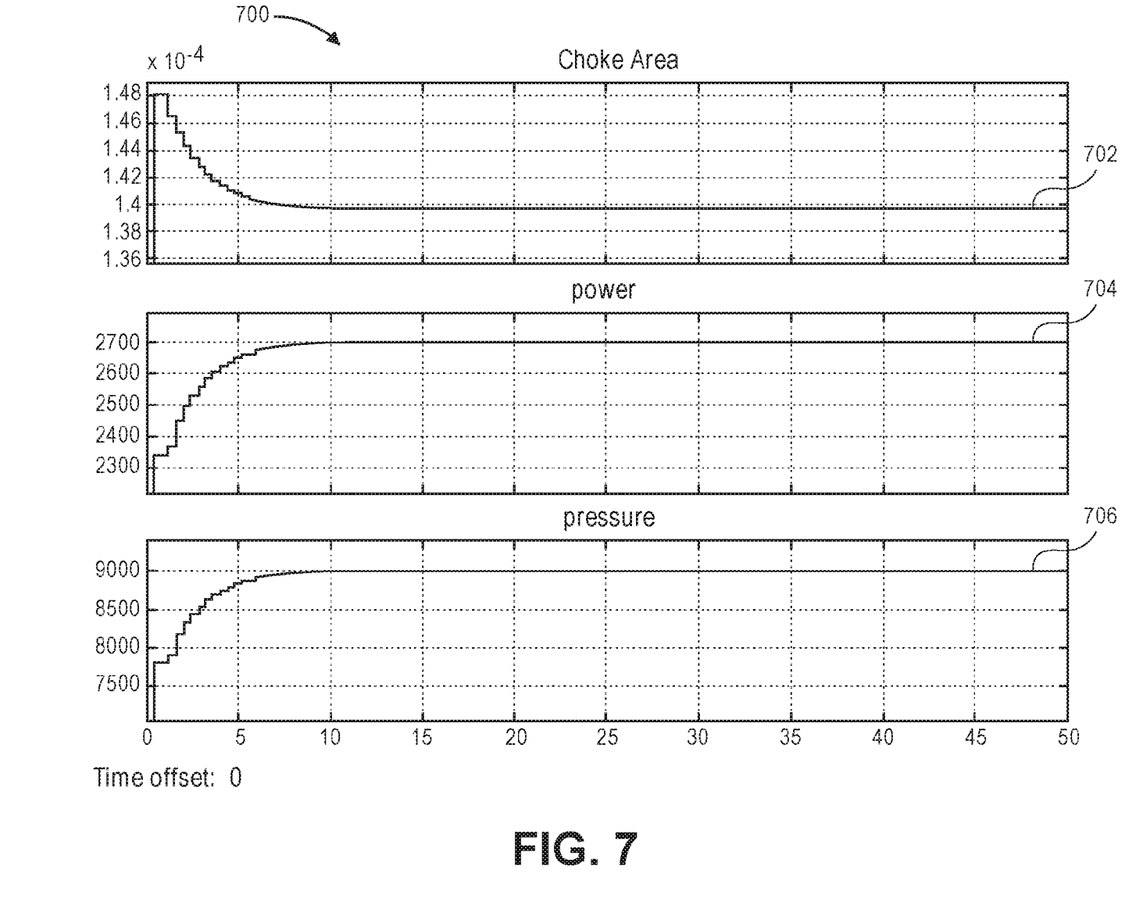
FIG. 7 illustrates plots for a current choke area, a pump power, and a pump pressure at a pump speed of the fracking rig pump, in accordance with an aspect of this disclosure.

Referring to FIG. 7, plots 700 illustrate a choke area plot 702 as a function of time, the pump power plot 704 as a function of time, and the pump pressure plot 706 as a function of time, as obtained from the reference model 116 after validation in the method 600. By way of example only, the plots 700 are for a triplex type fracking rig pump in which the maximum power is 2700 hp and the maximum pressure is 14750 psi at a pump speed of 150 rpm. The choke area plot 702 converges to 0.00014 (a.u.) in about 7 seconds and output power indicated by the pump power plot 704 reaches a maximum pump power of 2700 hp, while the pump pressure is below the maximum pump pressure of 14750 hp at 9000 hp. The first choke area adjustment and the second choke area adjustment are used to determine corresponding step sizes for the choke area plot 702 (e.g., between 0-5s as the value of the choke area 210 is converging to 0.00014). Depending upon the arbitration in the operation 612, one of the first choke area adjustment and the second choke area adjustment determine which step sizes will be used in the choke area plot 702.

Figure 8:
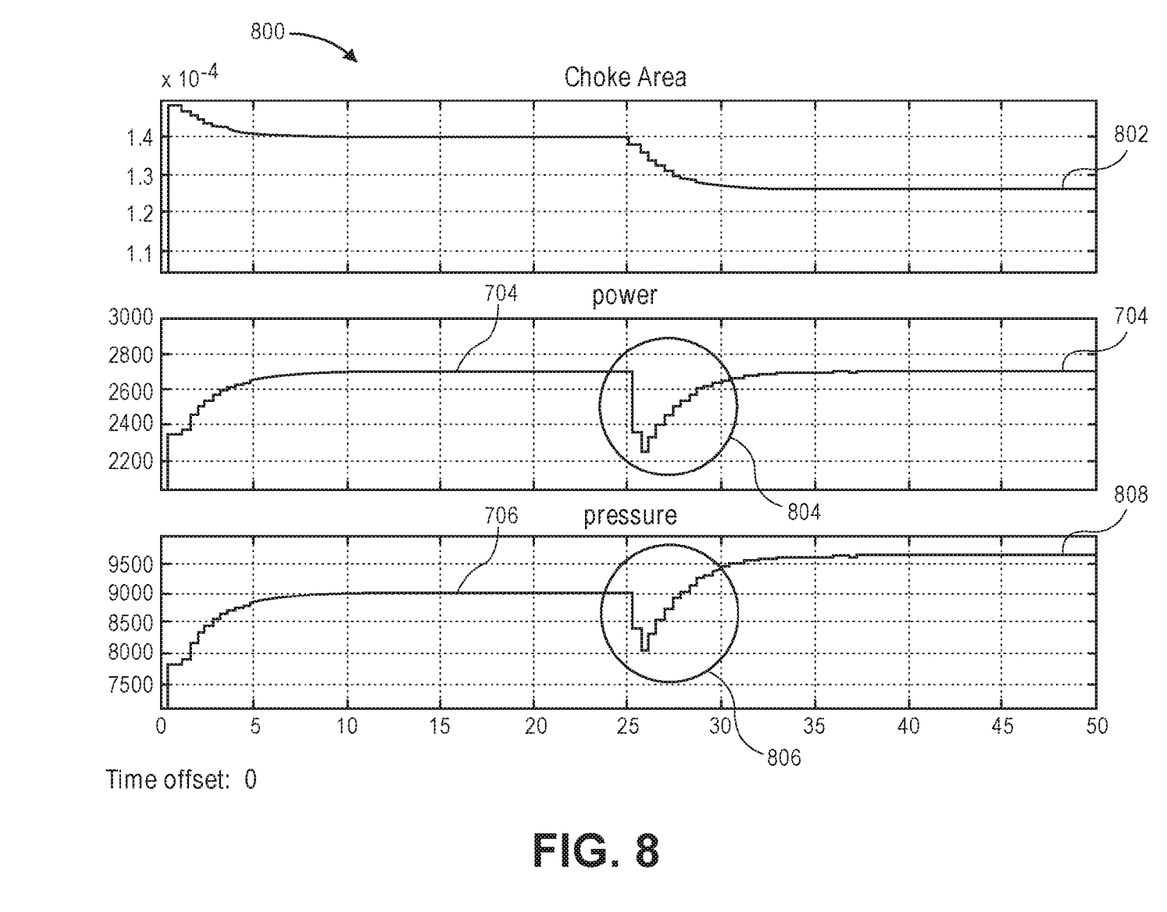
FIG. 8 illustrates plots for an updated choke area and corresponding pump power and pump pressure of the fracking rig pump at a different pump speed, in accordance with an aspect of this disclosure.

Referring to FIG. 8, plots 800 illustrate conditions for the fracking rig pump 102 when the pump speed changes from 150 rpm to 140 rpm at 25 sec with the initial choke area for the choke area 210 being 0.000148 (as illustrated in FIG. 7). As discussed, the pump speed may need to be changed due to a change in the flow of fluid at the choke area 210 of the well-head. Such change in the flow of the fluid may be due to the fracking operation proceeding from one stage to the next (each stage requiring different pressures and flows of fluid based on a geology of the earth at the fracking rig site), and/or due to leakages in the system 100. By way of example only, the plots 800 are also for the triplex type fracking rig pump of FIG. 7. As illustrated in FIG. 8, the current choke area converges to the updated choke area indicated by an updated choke area plot 802. In an actual scenario, such an updated choke area may result from changing conditions at the well-head of the fracking rig site at which the fracking rig pump 102 is deployed. To maintain a constant flow across the choke area 210, the pump speed changes to 140 rpm. To reflect the actual variation in the pump power and the pump pressure, the reference model updates the pump power plot 704 to stay at 2700 hp after an initial power dip indicated by a region 804, while the pump pressure is higher than 25 sec earlier as indicated by an updated pump pressure plot 808, after an initial pressure dip indicated by a region 806. However, the updated pump pressure plot 808 shows that the pump pressure is still below the maximum pump pressure of 14750 hp.

Accordingly, the pressure difference between the pump pressure measured by the processor 104 using the updated pump pressure plot 808 and the maximum pressure reflects how the current value of the choke area 210 has been updated in the reference model 116, as indicated by the updated choke area plot 802. Likewise, the power difference between the maximum power and the pump power plot 704 reflects how the current value of the choke area 210 has been updated in the reference model 116. Each of these measurements yield different values for the choke area 210 for the reference model 116, e.g., a first choke area measured from the pressure difference and the second choke area measured from the power difference, as discussed with respect to the operation 610 in FIG. 6. The processor 104 then arbitrates between the two choke areas to determine an updated choke area, reflected in the updated choke area plot 802. The reference model 116 is updated to store this value of the updated choke area from the updated choke area plot 802. The processor 104 may iteratively perform the operations 602-616 until a converged value of the choke area 210 is obtained such that the updated choke area in the operation 612 is the same as the current or actual value of the choke area 210 at the fracking rig site.

It will be appreciated that the operations 602-616 may be carried out by the processor 104 by executing the computer executable instructions 118 stored in the memory device 106. The computer executable instructions 118 may be executed using a high level or a low level language. In one aspect, distributed computing techniques may be used by the processor 104 such that the processor 104 may carry out the method 600 partly using computer code stored in the memory device 106 and partly using computer code stored at a location remote from the system 100, for example, in a remote base station computing system (not shown) in communication with the processor 104.

Further, it will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of particular numerical values and/or ranges of values herein are merely intended to serve as a shorthand method of referring individually to each separate value falling within the range, unless otherwise indicated herein, and each separate value is incorporated into the specification as if it were individually recited herein. The method 600 described herein can be performed in any suitable order unless otherwise indicated herein or otherwise clearly contradicted by context.

We claim:

1. A method for automatic tuning of a reference model for a fracking rig pump, the method comprising:
   determining, at a processor operably connected to a fracking rig pump, a current choke area associated with the fracking rig pump based upon at least a maximum power and a maximum pressure obtained from the fracking rig pump for a pump speed of the fracking rig pump;
   obtaining, at the processor, a pump power and a pump pressure for the current choke area from at least a reference model for the fracking rig pump stored in a memory device coupled to the processor;
   determining, at the processor, a pressure difference between the maximum pressure obtained from the fracking rig pump and the pump pressure obtained from the reference model;
   determining, at the processor, a power difference between the maximum power obtained from the fracking rig pump and the pump power obtained from the reference model; and
   providing, at the processor, an updated choke area to the reference model based upon at least one of the power difference and the pressure difference.

2. The method of claim 1, wherein the power difference and the pressure difference are based on detecting, at the processor, a change in fluid flow from the fracking rig pump.

3. The method of claim 2, wherein the change in the fluid flow is associated with a pressure variation in an aggregate discharge pressure of the fracking rig pump.

4. The method of claim 1, further comprising:
   determining, at the processor, a first choke area based upon the pressure difference;
   determining, at the processor, a second choke area based upon the power difference; and
   arbitrating, at the processor, between the first choke area and the second choke area for said providing the updated choke area to the reference model.

5. The method of claim 4, wherein the first choke area is determined based upon a first choke area adjustment, the first choke area adjustment being calculated from the power difference, and wherein the second choke area is determined upon a second choke area adjustment, the second choke area adjustment being calculated from the pressure difference.

6. The method of claim 1, wherein the updated choke area is a converged value of the current choke area based upon a feedback loop in which the processor iteratively performs the obtaining the pump power and the pump pressure, the determining the pressure difference and the determining the power difference.

7. The method of claim 1, further comprising:
   detecting, at the processor, a leak in the fracking rig pump based upon the pressure difference and the power difference.

8. A system for automatic tuning of a reference model for a fracking rig pump, comprising:
   a fracking rig pump;
   a processor operably connected to the fracking rig pump; and
   a memory device connected to the processor and including a reference model for the fracking rig pump, the memory device including computer executable instructions which when executed by the processor cause the processor to:
      determine a current choke area associated with the fracking rig pump based upon a maximum power and a maximum pressure obtained from the fracking rig pump for a pump speed of the fracking rig pump;
      obtain a pump power and a pump pressure for the current choke area from the reference model stored in the memory device coupled to the processor;
      determine a pressure difference between the maximum pressure obtained from the fracking rig pump and the pump pressure obtained from the reference model;
      determine a power difference between the maximum power obtained from the fracking rig pump and the pump power obtained from the reference model; and
      provide an updated choke area to the reference model based upon at least one of the power difference and the pressure difference.

9. The system of claim 8, wherein the power difference and the pressure difference are based on a change in a fluid flow from the fracking rig pump.

10. The system of claim 9, wherein the change in the fluid flow is associated with a pressure variation in an aggregate discharge pressure of the fracking rig pump.

11. The system of claim 8, wherein the computer executable instructions when executed by the processor further cause the processor to:
determine a first choke area based upon the pressure difference;
determine a second choke area based upon the power difference; and
arbitrate between the first choke area and the second choke area to provide the updated choke area to the reference model.

12. The system of claim 11, wherein the first choke area is determined based upon a first choke area adjustment, the first choke area adjustment being calculated from the power difference, and wherein the second choke area is determined upon a second choke area adjustment, the second choke area adjustment being calculated from the pressure difference.

13. The system of claim 8, wherein the updated choke area is a converged value of the current choke area based upon a feedback loop in which the processor is configured to iteratively obtain the pump power and the pump pressure, determines the pressure difference and determines the power difference.

14. The system of claim 8, wherein the computer executable instructions when executed by the processor further cause the processor to:
detect a leak in the fracking rig pump based upon the pressure difference and the power difference.

15. The system of claim 8, further comprising:
a suction pressure sensor, an in-cylinder pressure sensor, and a discharge pressure sensor located in the fracking rig pump and communicably coupled to the processor.

16. A non-transitory computer readable medium comprising computer executable instructions for automatic tuning of a reference model for a fracking rig pump operably connected to a processor, the computer executable instructions when executed by the processor cause the processor to:
determine a current choke area associated with the fracking rig pump based upon a maximum power and a maximum pressure obtained from the fracking rig pump for a pump speed of the fracking rig pump;
obtain a pump power and a pump pressure for the current choke area from the reference model stored in a memory device connected to the processor;
determine a pressure difference between the maximum pressure obtained from the fracking rig pump and the pump pressure obtained from the reference model;
determine a power difference between the maximum power obtained from the fracking rig pump and the pump power obtained from the reference model; and
provide an updated choke area to the reference model based upon at least one of the power difference and the pressure difference.

17. The non-transitory computer readable medium of claim 16, wherein the power difference and the pressure difference are based on a change in a fluid flow from the fracking rig pump.

18. The non-transitory computer readable medium of claim 17, wherein the change in the fluid flow is associated with a pressure variation in an aggregate discharge pressure of the fracking rig pump.

19. The non-transitory computer readable medium of claim 16, wherein the computer executable instructions when executed by the processor further cause the processor to:
determine a first choke area based upon the pressure difference;
determine a second choke area based upon the power difference; and
arbitrate between the first choke area and the second choke area to provide the updated choke area to the reference model.

20. The non-transitory computer readable medium of claim 19, wherein the first choke area is determined based upon a first choke area adjustment, the first choke area adjustment being calculated from the power difference, and wherein the second choke area is determined upon a second choke area adjustment, the second choke area adjustment being calculated from the pressure difference.

* * * * *